United States Patent [19]
Satterfield

[11] Patent Number: 6,128,386
[45] Date of Patent: Oct. 3, 2000

[54] MULTIPLE NUMBER BASE ENCODER/DECODER USING A CORRESPONDING EXCLUSIVE OR FUNCTION

[75] Inventor: Richard C. Satterfield, Wellesley, Mass.

[73] Assignee: Channel One Communications, Inc., Needham, Mass.

[21] Appl. No.: 09/019,915

[22] Filed: Feb. 7, 1998

Related U.S. Application Data

[63] Continuation-in-part of application No. 09/019,916, Nov. 9, 1994, Pat. No. 5,717,760.
[51] Int. Cl.[7] ........................................... H04L 9/28
[52] U.S. Cl. .............................. 380/28; 380/29; 380/37; 380/42
[58] Field of Search ................................................ 380/28

[56] References Cited

U.S. PATENT DOCUMENTS

| 3,706,941 | 12/1972 | Cohn | 331/78 |
| 4,519,031 | 5/1985 | Surendar et al. | 364/200 |

OTHER PUBLICATIONS

Abe et al. Higher Radix Nonrestoring Modular Multiplication Algorithm and Public–key LSI Architecture with Limited Hardware Resources, 1994.
Neal Koblitz, A Course in Number Theory and Cryptography, 2e, 1994.
Bruce Schneier, Applied Cryptography, 2e, 1996.
John Gregg, Ones and Zeros, Understanding Boolean Algebra, Digital Circuits, and the Logic of Sets, 1998.
John Bryant, SR–52 Program Simplifies Universal Number Conversion, Electronics, Jun. 9, 1977.
Herschell Murry, A General Approach for Generating Natural Random Variables, IEEE Trans on Computers, Dec. 1970.
Richard Voss and John Clarke, 1/f noise In music: Music from 1/f noise, J. Acoust Soc. Am, 63(1), Jan. 1978.
Michael E. Morotta, The Code Book, All About Unbreakable Codes and How to Use Them, 1979.
Nicholas Szabo and Richard Tanaka, Residue Arithmetic and Its Applications to Computer Technology, McGraw–Hill, 1967.
Jane Radatz, The IEEE Standard Dictionary of Electrical and Electronics Terms 6e, 1996.
C. S. Wallace, Physically Random Generator, Computer Sytems Science & Engineering, 5(2), Apr. 1990.
H. Graham Flegg, Boolean Algebra and its Application, Including Boolean Matrix Algebra, Blackie, 1964.

*Primary Examiner*—Gail O. Hayes
*Assistant Examiner*—James Seal
*Attorney, Agent, or Firm*—Cesari and McKenna, LLP

[57] ABSTRACT

Plaintext elements and masking array elements are converted into digits in another number base. The resulting digits are combined modulo the new number base and the result is converted back into elements using the original number base resulting in ciphertext elements. For recovery of the plaintext, the ciphertext elements and masking array elements are converted again into digits in the same number base as used for encryption and a reverse arithmetic combination of these digits is employed, modulo the new number base, and the result of the combination is converted back into elements in the original number base resulting in the original plaintext elements.

14 Claims, 3 Drawing Sheets

MULTIPLE NUMBER BASE ENCODER/DECODER USING A CORRESPONDING EXCLUSIVE OR FUNCTION

This patent application is a continuation-in-part of an allowed prior application, filed Nov. 9, 1994, that has matured into U.S. Pat. No. 5,717,760, and that issued Feb. 10, 1998. The disclosure of this patent is hereby incorporated by reference as though set out at length herein. This application is also closely related to pending U.S. patent application Ser. No. 09/019,916.

FIELD OF THE INVENTION

The present invention relates to apparatus and methods for encryption and decryption wherein a ciphertext is generated. More particularly, the present invention is related to the use of symmetric private key encryption. Once the sender and receiver have exchanged key information, encryption of a message by the sender and decryption by the receiver is accomplished in a direct manner.

BACKGROUND OF THE INVENTION

In 1917 Vernan created a telegraphic cipher system (U.S. Pat. No. 1,310,719; issued Jul. 22, 1919) which used the addition of the value of a message character on a paper tape with another character on a looped key tape; the sum of the values was transmitted as the cipher character. It was soon recognized that the security of the method relied on very long key tapes. Later to eliminate excessively long key tapes, Morehouse (1918) connected two Vernan telegraphic machines together employing two separate looped key tapes so that the output of the first modified the output of the second and this combined output encoded the message tape to create an enciphered message. These two loops had non equal lengths such that all the permutations of the characters on one would occur with all the characters on the other. Thus, two shorter tapes could mimic the employment of a single much larger tape. Mauborgne showed that the Morehouse system was cryptographically secure only when the key tape (or the permutation of two tapes) was comparable in length to the clear text to be encrypted and was used only one time. Any repetition of any kind of the key either within that message or its use to encrypt other messages would compromise the key tape. It was also shown that a ciphertext made using an encryption key the same size as the message itself but consisting of coherent text could be broken, but not if the key were a collection of random characters.

Dr. Man Young Rhee, in his book *Cryptography and Secure Communications* (McGraw-Hill, 1994) states on page 12: "A cryptosystem which can resist any cryptanalytic attack, no matter how much computation is allowed is said to be unconditionally secure. The one time pad is the only unconditionally secure cipher in use. One of the most remarkable ciphers is the one-time pad in which the ciphertext is the bit-by-bit modulo-2 sum of the plaintext and a nonrepeating keystream of the same length. However, the one-time pad is impractical for most applications because of the large size of the nonrepeating key."

U.S. Pat. No. 5,113,444 issued May 12, 1992 entitled "RANDOM CHOICE CIPHER SYSTEM AND METHOD" states "First random number strings are a relatively scarce commodity. Second, the receiver must have at hand exactly the same random number sequence the sender used or must be able to reproduce it. The first of these alternatives requires the sharing of an enormous amount of key material. The sharing of an enormous amount of key material is impractical. The second alternative is impossible." The first and second conclusions to these statements are inaccurate. Statistical analysis of the sampling of digital sources (specifically 16 bit sound files) shows that random or arbitrary numbers or bytes are readily available in the digital/computer environment. This ready availability of random numbers is contrary to the teachings and opinions of those skilled in the -art as well as those expert in the art of cryptography.

Another prevailing view of those skilled in cryptography is that a pseudo-random number series has an inherent weakness because the formula that generated the series may be reconstructed by others to predict the series.

U.S. Pat. No. 5,113,444, entitled "RANDOM CODING CIPHER SYSTEM AND METHODS" and U.S. Pat. No. 5,307,412, teach the use of a thesaurus and/or synonyms together with arithmetic/logic operations to combine data and masks to accomplish encoding/decoding. These patents are thus limited by the use of the thesaurus and synonyms.

U.S. Pat. No. 5,077,793 entitled "RESIDUE NUMBER ENCRYPTION AND DECRYPTION SYSTEM" teaches (column 3 lines 40 to column 4 lines 8): "If the moduli are chosen to be mutually prime, then all integers with the range of zero to the product of the moduli minus one can be uniquely represented. The importance of the residue number system to numerical process is that the operations of addition, subtraction, and multiplication can be performed without the use of carry operations between the moduli. In other words, each digit in the n-tuple can be operated on independently and in parallel." And shows that for the sum Z of the digits X and Y, the ith digit may be given by: $z_i = (x_i + y_i)$ mod mi and that "a sixteen bit binary number can be represented in the residue number system using five moduli 5,7,11,13,17." The moduli ($m_i$) are chosen to be relatively prime to each other. In Columns 5 and 6 the description goes on to define Z=(X+Y) mod M (where M is the product of all of the moduli, i.e., $M = m_1 \times m_2 \ldots m_n$) is a generalization of the Vigenere cipher. If Z=(X-Y) mod M is used to encrypt X using Y then X may be recovered from Z by X=(Y-Z) mod M, which is a generalization of the Beaufort cipher. The method described by this patent requires that multiple and different moduli must be used at the same time to calculate different residues which are transmitted to a receiver to uniquely define the number which was encrypted. The encryption method described herein does not use multiple moduli and is different from this patent. Because different moduli are not used, the encryption/decryption apparatus may be simpler in design.

Pages 13 through 15 in "Applied Cryptography, Second Edition" by Bruce Schneier, John Wiley & Sons, Inc. 1996, provide a critique on the security inherent in the Vigenere encryption method. "The simple-XOR algorithm is really an embarrassment; it's nothing more than a Vigenere polyalphabetic cipher." "There is no real security here. This kind of encryption is trivial to break, even without computers. It will take only a few seconds with a computer. Assume the plaintext is English. Furthermore, assume the key length is any small number of bytes. Here's how to break it:

1. Discover the length of the key by a procedure known as counting coincidences. XOR the ciphertext against itself shifted various number of bytes, and count those bytes that are equal. If the displacement is a multiple of the key length, then something over 6 percent of the bytes will be equal. If it is not, then less than 0.4 percent will be equal (assuming a random key encrypting normal ASCII text; other plaintext will have different numbers). This is called the index of coincidence. The smallest displacement that indicates a multiple of the key length is the length of the key.

2. Shift the ciphertext by that length and XOR it with itself. This removes the key and leaves you with the plaintext XORed with the plaintext shifted then length of the key. Since English has 1.3 bits of real information per byte, there is plenty of redundancy for determining a unique decryption."

The above method for breaking a Vigenere cipher relies on the fact that XOR (base 2) is its own inverse and that the encrypting key (masking bytes) are repeated many times. The XOR is its own inverse because A XOR B XOR B=A. It is an object of the present invention to improve upon the security of the Vigenere and Variant Beaufort cipher methods by applying them not to characters directly but rather to digits representing that character in another number base.

Pages 70 and 71 in "Cryptography: An Introduction to Computer Security" by Jennifer Seberry and Josef Pieprzyk, Prentice Hall, 1989—"The Vigenere cipher. The key is specified by a sequence of letters: $K=k_1 \ldots k_d$ where $k_i$, (i=1, ... ,d) gives the amount of shift in the ith alphabet, that is: $f_i(a)=a +k_i$ (mod n)." "Variant Beaufort cipher. Here we use: $f_i(a)=(a-k_i)$ (mod n). Since $a-k_i=a+(n-k_i)$ (mod n) the Variant Beaufort cipher is equivalent to the Vigenere cipher with the key character $n-k_i$. The Variant Beaufort cipher is, in fact, the inverse of the Vigenere cipher since if one is used to encipher the other is used to decipher."

Historically the Vigenere and Variant Beaufort ciphers have been applied to whole letters or characters. That is, the value (position in the alphabet) of a character has a number either added or subtracted to it (modulo the length of the alphabet) and the resultant number is used to specify a character position in the alphabet and the character at that position is sent as the ciphered character.

Herein BCN refers to the binary to base n conversion of a number and the representation of the base n number as a digit shown in binary. A common example (base 10) is BCD (binary coded decimal) where the values 0 through 9 are represented by 4 binary bits.

Herein a byte is defined as two or more bits. In typical usage a byte is considered to be, but is not limited to, eight bits.

Herein, arrays (or masks) are described as being comprised of elements. Such elements are defined as any actual or logical grouping, for example: a bit, a nibble, a byte or word of any length.

It is an object of the present invention to provide an encryption/decryption apparatus and method that does not depend upon the use of thesaurus's and/or synonyms and/or other forms of look-up tables.

It is yet another object of the present invention to provide an encryption/decryption scheme wherein the presentation of a character in one number base is transformed into a corresponding representation in another number base.

SUMMARY OF THE INVENTION

The foregoing objects are met in an encryption/decryption apparatus where a message or information expressed as elements or characters is to be encrypted from transmission or sending to another where the message will be decrypted. A mask of elements or characters is defined and utilized in the encryption/decryption. The message elements and mask elements are converted into corresponding elements in another new number base system, where this new number base system is not binary. The converted message and mask elements are combined, element by element, respectively, thus forming a new set of elements which are defined as a ciphertext. This ciphertext may be sent or transformed into a set of elements in yet another number base that is suitable for transmission.

To decode the ciphertext, mask elements, identical to those used for encryption, are converted into corresponding elements in another number base (the same number base as that of the digits of ciphertext. Then these elements are combined, element by element, respectively using the inverse from that which was used for encryption, thus forming a new set of elements which when converted to a number in the original message number base is the plaintext message.

Herein XORn (XOR+ and XOR−) describes an exclusive-or operation (base n) defined as: let the numbers A and B base n be defined (for m digits).

$$A = \sum_{i=0}^{m-1} n^i a_i \qquad \text{and} \qquad B = \sum_{i=0}^{m-1} n^i b_i$$

Then, in a preferred embodiment, the elements A and B may be combined according to the following equations.

$$C = A\ XOR + B = \sum_{i=0}^{m-1} n^i ((n + a_i + b_i) \bmod n) \qquad \text{Eq. 1}$$

and $$C = A\ XOR - B = \sum_{i=0}^{m-1} n^i ((n + a_i - b_i) \bmod n) \qquad \text{Eq. 2}$$

For base 2, XORn is identical to the standard XOR operation. The conversion of a binary number to j digits (base n) is done by the successive division of the number by n where the remainder of each division becomes the ith digit for i=0 to j−1. The digits of a number (base n) are converted back to binary by: setting sum=0, then for i=j−1 to 0 perform sum=(sum * n)+$digit_i$. When done the result is in sum.

An advantage of the present invention is that an encryption method employing an XOR (base 2) is strengthened by the use of a base greater than 2. This is because A XORn B XORn B does not equal A.

Another advantage of the present invention is that each byte to be encrypted and each masking byte (key byte) in a preferred embodiment are converted from binary into a string of digits or elements base n (n>2) and the operations of equation 1 and 2 are applied to these digits in a systematic manner. Only one number base, or moduli, is used at a time.

In a preferred embodiment of the present invention the equations 1 and 2 are used to advantage since there is no repeating key (as a key is usually thought of) because the key is now the sequence of digits resulting from the conversion of binary masking bytes to digits of another number base. The masking byte string is now not limited to a few characters, but can be a very long series of bytes. Though it would still be possible to have a repeating series of digits if the masking bytes followed a repeating sequence, the ready availability of arbitrary masking bytes in the computer environment should lessen this occurrence. These bytes may be derived from any of several digital sources including, but not limited to, the sampling of digital sources, the application of numeric hashing functions, pseudo-random number generation and other numeric operations.

In a preferred embodiment the equation 1 is used for encryption and equation 2 is used for decryption. Since these are inverse ciphers, in another preferred embodiment equation 2 is used instead for encryption and equation 1 is used for decryption. For simplicity, only the first method is shown, but the implementation of the second scheme will be understood by someone skilled in the art.

Arbitrary and random numbers are created by normal digital processes. Most digitized music which comes on a CD-ROM is 16 bits of Stereo sampled at a 44.1 kilohertz rate. This produces approximately 10.5 million bytes per minute. Of these about one half may be used as arbitrary data bytes, or about 5 million bytes per minute. Reasonably random data byte are generated by reading in the digital data stream which makes up the music and throwing away the top 8 bits and sampling only the lower eight bits of sound to produce an arbitrary or random number. Fourier analysis on the resultant byte stream shows no particular patterns. It should be kept in mind that silent passages are to be avoided. If taking every byte of music in order is undesirable, then using every nth byte should work quite well for small values of n between 11 and 17. Please note, the error correction inherent with a music CD-ROM is not perfect and the user might want to convert the CD-ROM music format to a WAVE (.WAV) file format and then send the WAVE (.WAV) file to someone by either modem, large capacity removable drive, digital magnetic tape cartridge, or by making a digital CD-ROM containing the WAVE (.WAV) file.

Another source of arbitrary or random digital numbers may be found in the pixel by pixel modification (exclusive-oring, adding, subtracting) of several pictures from a PHOTO CD-ROM, again looking at the low order bytes. Computer Zipped (.ZIP) files and other compressed file formats can be used.

The sender and receiver must agree ahead of time on the sources to be used for the masking bytes and how these sources will be sampled and/or combined to create the masking bytes to be used to encrypt and decrypt a message.

In other preferred embodiments, the intelligent sampling of digital sources can be used to advantage to lessen the reconstruction of the byte stream used for encryption. In addition, encryption and hashing algorithms may be used to modify the digital sources prior to their use. Moreover, the modification of pseudo-random numbers for tables, arrays and/or masks may also be used to advantage.

Other objects, features and advantages will be apparent from the following detailed description of preferred embodiments thereof taken in conjunction with the accompanying drawing.

DETAILED DESCRIPTION OF PREFERRED EMBODIMENTS

Figure 1A:
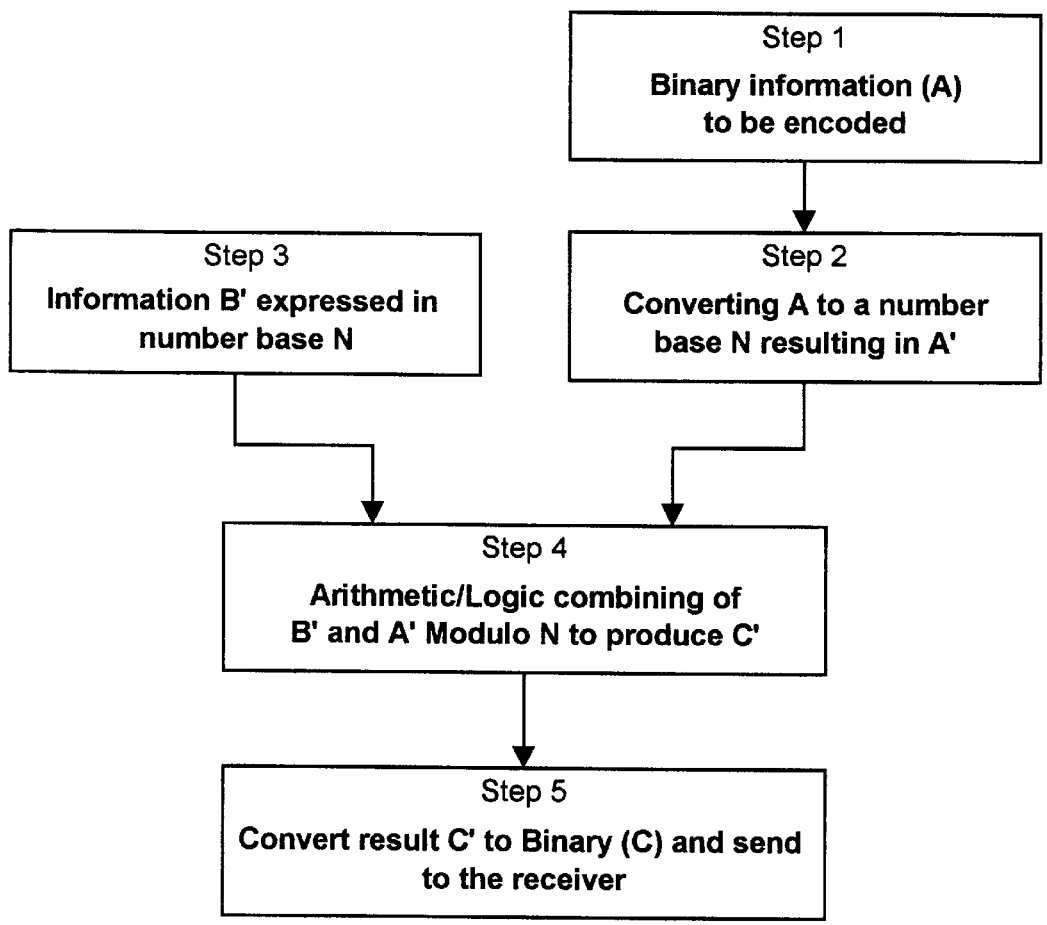
FIG. 1A is a flow chart outlining an encoder process of a preferred embodiment of the present invention.

FIG. 1A shows a preferred embodiment of the steps for encoding a binary value. In step 1, binary information to be encoded (A) is presented to an encoder for step 2. In step 2, the binary information is converted into digits of characters (A') expressed in another number base N. In step 3, the digits or characters (B'), expressed in base N, are stored or formed. The digits of A' and B' are combined in step 4 according to Eq. 1, resulting in digits C' expressed in number base N. The C' digits are an encrypted form of the original information A.

In step 5, these digits, C', are converted to a binary number (C) which is a convenient number base for sending to a receiver.

Figure 1B:
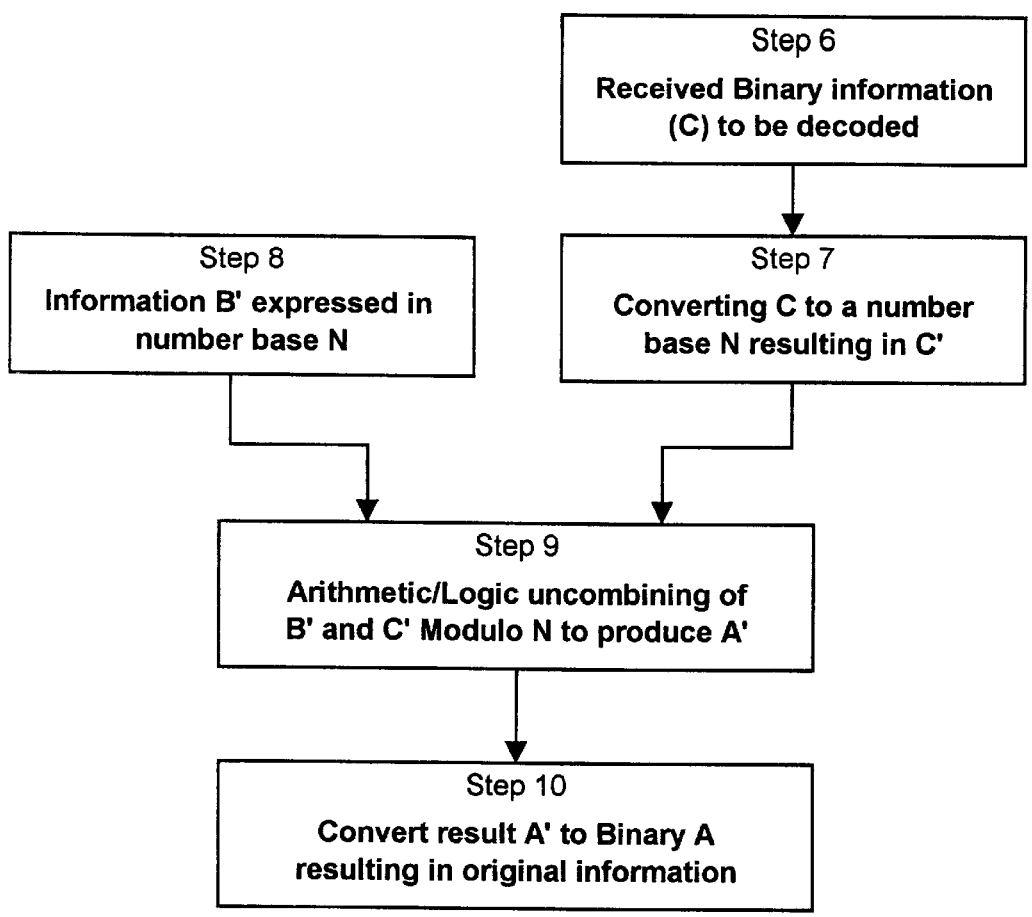
FIG. 1B us a flow chart outlining a decoder process of a preferred embodiment of the present invention.

FIG. 1B shows the steps needed for a receiver of the digits sent as described in FIG. 1A to decode the received encoded digits. In step 6, the encoded binary digits C are received for decoding. In step 7, the C digits are converted into digits in the number base N forming digits c'. In step 8, the digits b' are stored formed. The digits C' and B' are combined in step 9 according to Eq. 2 which results in the digits A'. In step 10, the digits of A' are converted back into the original binary A.

In the process illustrated in FIGS. 1A and 1B, the order of use of Eq. 1 and Eq. 2 may be reversed, where Eq. 2 is used in step 4 of FIG. 1A, and Eq. 1 is used in step 9 of FIG. 1B.

Still referring to FIGS. 1A and 1B, the binary information A may be expressed as 8 bit bytes, but any size byte may be used. A', B' and C' are numbers expressed as digits in a number base N. Also, source B' information may be from any random, pseudo-random, or arbitrary source, as described herein. Moreover, other logic/arithmetic operations may be used to provide additional security at substantially any step of FIGS. 1A and 1B.

As is known in the art, care must be used to ensure that calculations avoid duplications and are consistent with buffer sizes and bit widths, especially when number bases other than two are used.

Figure 2:
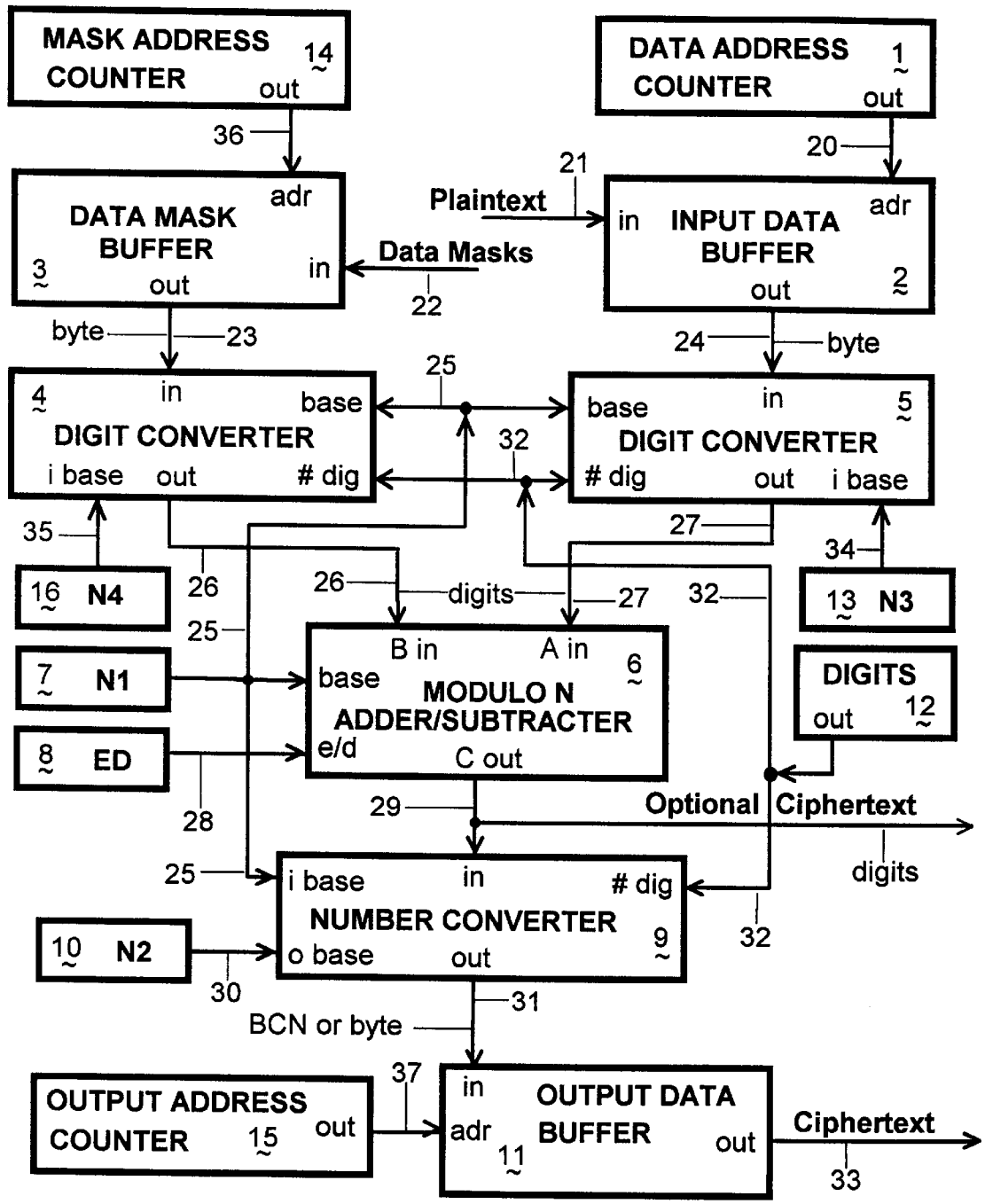
FIG. 2 is a block diagram of the encoder/decoder.

FIG. 2 shows a basic block diagram of the Encoder/Decoder. The next description will be for processing binary input (N3=2) to binary output (N2=2) with binary masking bytes (N4=2). N1 will be any value greater than 2. M bytes of plaintext are loaded into the INPUT DATA BUFFER, 2, via line 21. In addition, M masking bytes are loaded into the DATA MASK BUFFER, 3, via line 22.

The address counters, DATA ADDRESS COUNTER, 1, MASK ADDRESS COUNTER, 14, and the OUTPUT ADDRESS COUNTER, 15, are all initialized to 0. These counters will be clocked M times to process a whole buffer. ED is a 1 bit binary flag used to indicate which equation (#1 or #2) will be utilized by the encoder/decoder. For encoding ED is set =0, while for decoding, ED is set =1. N1, 7, is the number base to be used for the XOR operation. N2, 10, is the number base to be used for the conversion of the digits (based N1) back into a byte to be put into the output buffer. Normally N2 would be 2 for binary output bytes. N3, 13, is the number base for the input data bytes and is normally 2 for binary input bytes. The number of internal digits for the DIGIT CONVERTERs (4 and 5) and the NUMBER CONVERTER, 9, are supplied by DIGITS (the number of digits), 12, via line 32. The number of digits needed is determined by the number base for the XOR operation and the bit width of the bytes to be processed. The value of DIGITS is calculated as follows: $DIGITS \geq (\ln(2^{(No\ of\ Bits)} - 1)/(\ln(N1))$. If the number of bits is 8 ($2^8-1=255$) and the number base for the XORn is 15, then 3 digits will be required because $\ln(255)/\ln(15)$ is 2.04 which is rounded up to the next integer value of 3.

The DATA ADDRESS COUNTER, 1 is sent via 20 to the INPUT DATA BUFFER, 2. The MASK ADDRESS COUNTER, 14, is sent via 36 to the DATA MASK BUFFER, 3. The OUTPUT ADDRESS COUNTER, 15, is sent via line 37 to the OUTPUT DATA BUFFER, 11. These counters are used to specify which bytes will be selected from the INPUT DATA BUFFER, 2, and DATA MASK BUFFER, 3, and where the resultant byte will be placed in the OUTPUT DATA BUFFER, 11. A byte from the INPUT DATA BUFFER, 2, is sent via line 24 to the DIGIT CONVERTER, 5. Similarly, a byte from the DATA MASK BUFFER, 3, is sent via line 23 to the DIGIT CONVERTER, 4. N1 (the number base for the XORn operation), 7, via line 25 is sent to the "base" inputs for DIGIT CONVERTERs 4 and 5 and the "i base" input of the NUMERIC CONVERTER, 9. N3, 13, (the number base for the input data byte) in this case is set equal to 2 (for binary) and is sent via 34 to DIGITS CONVERTER, 5. Similarly, N4, 16, (the number base for the mask byte) in this case is also set equal to 2 (for binary) and is sent via 35 to DIGITS CONVERTER, 4. The number of DIGITS, 12, is sent via 32 to the "# dig" inputs for the DIGITS CONVERTERs 4 & 5 and the NUMERIC CONVERTER 9.

The binary input data byte is converted into digits base N1 in the DIGITS CONVERTER, 5, and the resulting digits are sent via line 27 to the "A in" input of the MODULO N ADDER/SUBTRACTER, 6. The conversion of a binary number to j digits (base n) is done by the successive division of the number by n where the remainder of each division becomes the ith digit for i=0 to j−1. Or this conversion may also be accomplished by table look up using tables calculated ahead of time. Similarly, the binary mask byte is converted into digits base N1 in the DIGITS CONVERTER, 4, and the resulting digits are sent via line 26 to the "B in" input of the MODULO N ADDER/SUBTRACTER, 6. ED, 8, is sent via line 28 to the "e/d" input of the MODULO N ADDER/SUBTRACTER, 6. If ED=0, then for each "j" digit, $C_j=(A_j+B_j)$ Mod N1. If ED=1 then for each digit, $C_j=(N1+A_j-B_j)$ Mod N1. The digits ($C_j$) resulting from the operations within the MODULO N ADDER/SUBTRACTER, 6, are sent via line 29 to the input of the NUMBER CONVERTER, 9. Optionally, the output digits of the MODULO N ADDER/SUBTRACTER, 6, can be considered as a series of ciphertext output digits (instead of being converted back to a binary value). These digits may be used by some other process for transmission to a receiver. If ED=1, the output of the MODULO N ADDER/SUBTRACTER, 6, would be digits representing the original plaintext. And for this illustration would be the binary plaintext only after conversion to binary in the Number converter, 9.

The value of the output number base N2, 10, is sent via line 30 to the "o base" input for the NUMBER CONVERTER, 9. When N2=2, the digits sent to the NUMBER CONVERTER, 9, are converted back to binary by: setting sum=0, then for j=DIGITS-1 to 0 perform sum=(sum * N1)+$C_j$ where $C_j$ is the result of $A_j$ XORn $B_j$. When done the result in sum. This number base conversion may also be accomplished by table lookup using tables calculated ahead of time. If N2=2 (binary) the resultant binary value in sum is sent via line 31 to the OUTPUT DATA BUFFER, 11.

If N2 is not equal to 2, then the binary value of sum is converted to digits based N2 (by the method described above) and these digits are used to form BCN digits in the output byte and the output byte (in BCN format) is then sent via line 31 to the OUTPUT DATA BUFFER, 11.

These steps are repeated until all of the bytes in the input buffer have been processed and placed in the output buffer. Then the ciphertext is sent via line 33 to the user. If ED=i, then the output buffer contains plaintext.

The use of number bases (other than binary) for input and output can alter the operation of the encoder/decoder. The following examples all use number bases greater than 2.

If N2 (the number base for the output result) is equal to N1 (the number base for the XORn calculations) then the digits, resulting from the XORn calculation, are placed in the OUTPUT DATA BUFFER, 11, via line 31, without change. This requires that the size of the OUTPUT DATA BUFFER, 11, must be greater than the INPUT DATA BUFFER in order to hold the digit values in output bytes. Also, the OUTPUT ADDRESS COUNTER, 15, must send more addresses to the OUTPUT DATA BUFFER to handle the extra information being stored. The resulting Ciphertext can be in digit or BCN format depending upon the implementation.

If either the Plaintext, 21, or the Data Masks, 22, are in digit or BCN format and the number base for either of these inputs is the same as the number base for the XORn calculation (N3 or N4=N1), then these digits (=N1) are passed through the respective DIGIT CONVERTER (4 or 5) without change. This case requires that the respective address counter must be incremented an appropriate number of extra times to cause the required number of digits to be sent to the MODULO N ADDERISUBTRACTER, 6.

If either of the Plaintext, 21, or Data Masks, 22, are in either a BCN or digit format and N3 or N4 N1, then the appropriate input ( N1) is first converted by the respective DIGIT CONVERTER (4 or 5) internally to binary before being converted to base N1 digits.

In some preferred embodiments the conversion of bytes into digits based n is achieved by table lookup instead of by repetitive division of the byte by n. In addition, the conversion of the digits (based n) into binary or another number base is also accomplished by table lookup.

In other another preferred embodiment, not shown, the input data and masking data bytes are 16 bits wide, and other counters, tables, variables or arrays are used to modify the e/d input of the MODULO N ADDER/SUBTRACTER causing the method of combining digits to be altered (between equation 1 and 2 forms) while the buffers are being processed. In another preferred embodiment, the data bytes in the input and output buffers are processed as if all of the bits in the buffer constitute one very large byte. Other preferred embodiments use a byte width which is larger than 16 bits.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Encryption/decryption apparatus comprising:
  a. means for retrieving information to be encoded/decoded, said information defining an array D1 of fist elements expressed in a number base M,
  b. first means for converting each of said first elements into an array D3 of third elements d3 expressed in a number base N, wherein N is an integer greater than two,
  c. means for retrieving fourth elements d4 of an array D4 wherein said fourth elements are expressed in said number base N,
  d. means for combining at least one of the elements d3 of array D3 with at least one of the elements d4 of array D4, according to the relationship N+d3 (XOR+) d4, thereby forming fifth elements of an array D5, and
  e. second means for converting the elements of D5, base N, into an array of such elements, D6, expressed in the number base M, wherein the array D6 is the ciphertext of D1 when encrypting and wherein array D6 is the plaintext when decrypting.

2. The encryption/decryption apparatus as defined in claim 1 further comprising:

means for retrieving second elements of an array D2 expressed in any number base, and second means for converting said second elements into said array D4.

3. The encryption/decryption apparatus as defined in claim 1 wherein the relationship d3 (XOR+) d4 is replaced by the relationship N+d3 (XOR−) d4.

4. The Encryption/Decryption apparatus as defined in claim 1 wherein said array D6 is expressed in a number base different from M.

5. The Encryption/Decryption apparatus as defined in claim 1 wherein the means for combining includes a look-up table.

6. The Encryption/Decryption apparatus as defined in claim 1 wherein the first means for converting includes a look-up table.

7. The Encryption/Decryption apparatus as defined in claim 1 wherein array D2 includes numbers selected from the group consisting of random numbers, pseudo-random numbers and arbitrary numbers.

8. A method for encryption/decryption comprising the steps of:

a. retrieving information to be encoded/decoded, said information defining an array D1 of first elements expressed in a number base M, b. first converting each of said fist elements, one by one, into an array D3 of third elements expressed in a number base N, wherein N is an integer greater than two, c. retrieving fourth elements of an array D4 wherein said forth elements are expressed in said number base N, d. combining at least one of the elements d3 of array D3 with at least one of the elements d4 of array D4, according to the relationship N+d3 (XOR+) d4, thereby forming fifth elements of an array D5, and e. second converting the elements of D5, base N, into an array of such elements, D6, expressed in the number base M, wherein the array D6 is the ciphertext of D1 when encrypting and wherein array D6 is the plaintext when decrypting.

9. The method defined in claimed in claim 8, further comprising the steps of:

retrieving second elements of an array D2 expressed in any number base, and second converting said second elements into said array D4.

10. The method as defined in claim 8 wherein the the relationship N+d3 (XOR+) d4 is replaced by the relationship N+d3 (XOR−) d4.

11. The method as defined in claim 8 wherein the step of combining includes the step of looking-up said elements of D5 from a look-up table.

12. The method as defined in claim 8 wherein the first means for converting includes the step of looking-up said elements of D3 from a look-up table.

13. The method as defined in claim 9 wherein the first means for converting includes the step of looking-up said elements of D4 from a look-up table.

14. The method as defined in claim 9 wherein array D2 includes numbers selected from the group consisting of random numbers, pseudo-random numbers and arbitrary numbers.

* * * * *